G. DOONAEVSKI.
INSTRUMENT OF PRECISION.
APPLICATION FILED JULY 9, 1918.
1,282,392.
Patented Oct. 22, 1918.
2 SHEETS—SHEET 1.
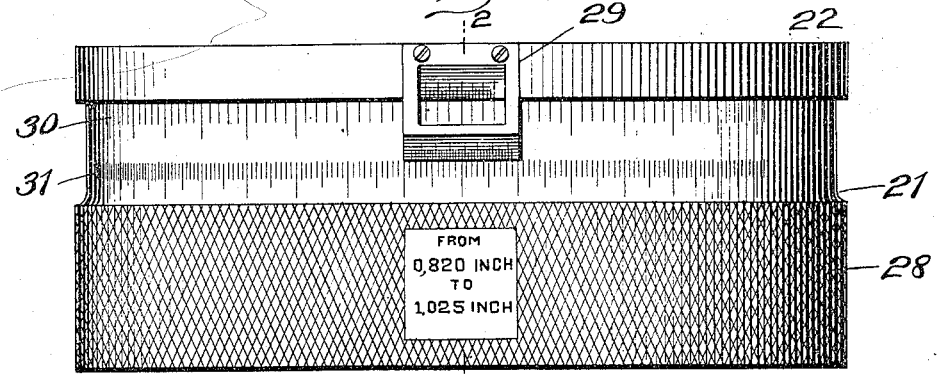
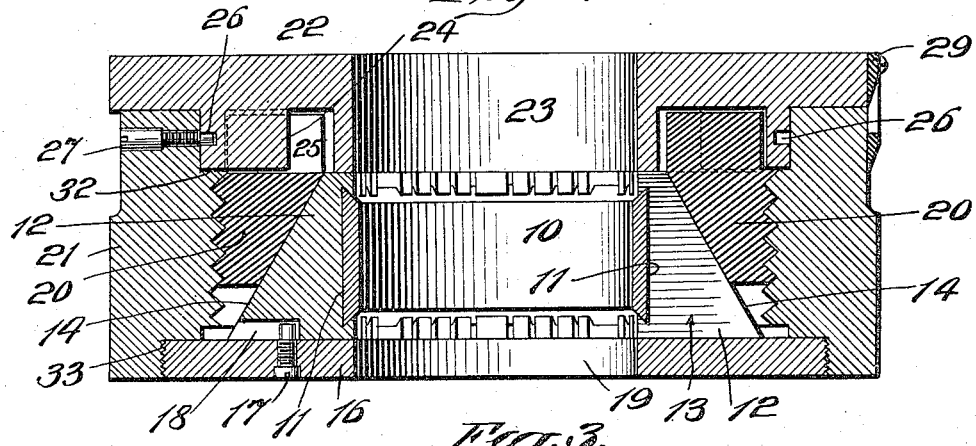
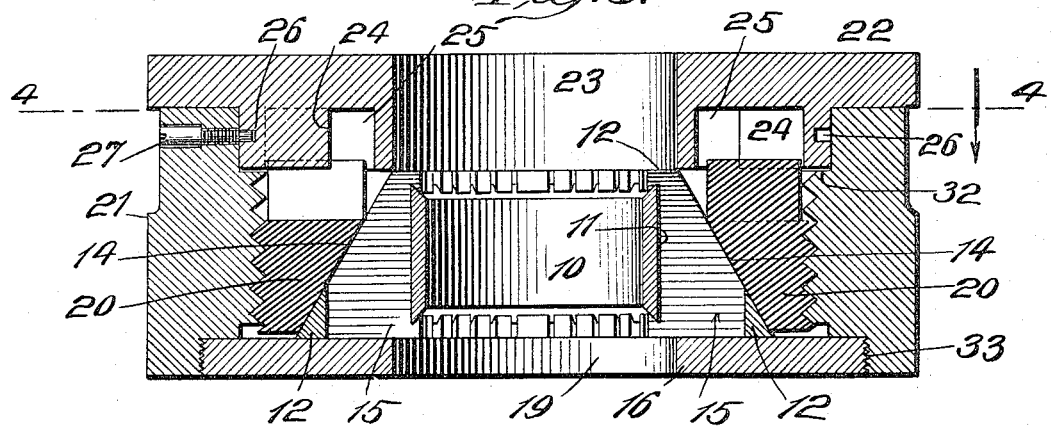
Inventor
GEORGE DOONAEVSKI
By his Attorney
Chas. E. Gill

UNITED STATES PATENT OFFICE.

GEORGE DOONAEVSKI, OF HINSDALE, MASSACHUSETTS.

INSTRUMENT OF PRECISION.

1,282,392.  Specification of Letters Patent.  Patented Oct. 22, 1918.

Application filed July 9, 1918. Serial No. 244,019.

*To all whom it may concern:*

Be it known that I, GEORGE DOONAEVSKI, a citizen of Poland, and a resident of Hinsdale, in the county of Berkshire and State of Massachusetts, have invented certain new and useful Improvements in Instruments of Precision, of which the following is a specification.

The invention pertains more particularly to a gage ring for measuring the external diameters of work in the course of manufacture or manufactured. The ring has been designed with the purpose of affording an adjustable measuring gage for cylindrical bodies, but it may also be employed for the verification of the exactitude of the grinding teeth of milling cutters and for other purposes. The invention is not limited to the measuring of any particular articles, and it is adjustable both for minimum and maximum measurements.

The instrument of my invention comprises a lamella or gage ring, a sectional conical ring carrying the same and against which the lamella acts to increase the diameter of the gage, an exterior conical ring engaging the sections of said sectional ring for closing the same and the lamella inwardly to attain a decreased diameter of the gage, means for rotating said exterior conical ring in accordance with the diameter of gage desired and an external casing or barrel portion housing the parts mentioned and therewith completing a gage adapted for convenient use.

The invention will be fully understood from the detailed description hereinafter presented, reference being had to the accompanying drawings, in which:

Figure 1 is a side elevation of an instrument or gage constructed in accordance with and embodying my invention;

Fig. 2 is a vertical section through the same, taken on the dotted line 2—2 of Fig. 1, the instrument being shown as having its parts set for maximum measurement of a cylindrical body;

Fig. 3 is a vertical section through the same, taken on the dotted line 3—3 of Fig. 4 and illustrating the parts of the instrument as set for the minimum measurement of a cylindrical body;

Fig. 4 is a horizontal section through the same taken on the dotted line 4—4 of Fig. 3;

Fig. 5 is a detached top view of one of the sections of an inner conic ring or sectional body carrying the lamella-ring, and Fig. 6 is a bottom view, on a smaller scale, of the lower end of the instrument, the exterior barrel portion thereof being omitted.

Referring to the drawings, 10 designates a flat steel lamella or gage ring proper, the lamella being a flexible steel strip suitably curved to form a ring and having inwardly beveled upper and lower edges, as clearly represented in Figs. 2 and 3. The lamella 10 for a minimum diameter has its two ends substantially together and forms a complete ring, whereas under the condition of a maximum diameter the ends of said lamella are separated from each other so that the ring is not then completely formed, but nevertheless is sufficiently formed to afford a proper gage ring. The dimensions of the lamella 10 are so calculated that the ring formed thereby is for a maximum diameter incomplete by a distance equal to about one-fifth of the circumference defined by the lamella.

The lamella 10 is inserted within a dovetail recess 11 formed in a sectional conic ring 12, there preferably being three corresponding sections in said ring and each of the character illustrated in Fig. 5, in which I number one of the sections of the conic ring, as 13. The sections of the conic ring 12, while having the dove-tail recess 11 to receive the lamella 10 along their inner vertical sides, have downwardly and outwardly inclined outer surfaces 14 which impart a conical formation to the segmental sections 13 of the ring 12. The segmental sections 13 of the conic ring 12 have radial slots 15 cut vertically in them from their inner edges nearly out to their outer edges, as illustrated, and these slots or partial incisions serve to make possible the enlargement and diminution of the internal diameter of the conic ring 12.

The sections of the conic ring 12 are seated upon a bottom disk 16, and said sections may be guided in their movement outwardly and inwardly by means of screws 17 extending upwardly through the disk 16 and entering slots 18 formed in the bottom of the sections 13 of said ring. The disk 16 is a plain disk having an opening 19 in its center to admit to the lamella 10 the articles to be measured or gaged.

The lamella 10 acts with spring effect to move the segmental sections 13 of the conic ring 12 outwardly or to define as large a diameter as the other portions of the instrument will permit, and to secure the diminution of the internal diameter of the ring 12 and consequently of the ring represented by the lamella 10, I make use of a conic ring 20 having an external threaded edge and an inner edge which tapers downwardly and outwardly and matches the taper on the exterior sides of the segmental sections 13 of the conic ring 12. The conic ring 20 is screwed into the exterior barrel or casing 21 of the instrument and its inner inclined surface is always in engagement with the outer inclined surface of the ring 12. When the ring 20 is screwed downwardly against the segmental sections 13 of the ring 12, they serve to force said sections inwardly and thereby decrease the diameter defined by the ring 12 and lamella 10, and when the ring 20 is screwed upwardly so as to release a part of its pressure from the ring 12, the sections 13 of said ring 12 will expand outwardly and thereby the diameter defined thereby will be increased.

The means I provide for actuating the wedge ring 20 is a top disk 22 having a central barrel portion 23 in line with the opening 19 in the disk 16. The top disk 22 is formed with downwardly projecting lug portions 24 which enter correspondingly formed recesses 25 in the upper portion of the ring 20, these recesses 25 being above that portion of the ring 20 which is threaded to engage the casing 21 or inclined to engage the sections of the ring 12. The projections 24 of the disk 22 and recesses 25 of the ring 20, serve to key said disk and ring together so that on the rotation of the disk, the ring 20 will be caused to rotate and thereby become screwed downwardly within the casing 21 or upwardly therein in accordance with the effect it is desired to produce on the sections of the ring 12. For the purpose of conveniently retaining the top disk 22 in position, I provide the same with an annular groove 26 to receive the smooth points of a suitable number of screws 27 which will be introduced through the side walls of the casing 21.

I preferably mill the lower external walls of the casing 21, as indicated at 28, for convenience in the handling of the instrument, and above the portion 28 of the casing 21 I provide the exterior walls of said casing with scales, and preferably two of the scales being employed, one indicating inches and the other millimeters, as shown in Fig. 1. The top disk 22 is preferably provided with a double nonus 29 to move along the scales, which I number 30, 31, respectively, on the casing 21. The function of the nonus 29 is to assist in placing the ring 12 and lamella ring 10 to the required diameter.

The casing 21 at the upper edge of its threaded portion is formed with a shoulder 32 on which the outer edges of the projections 24 may set and rotate, and the lower end of the casing 21 is formed with a threaded recess 33 to receive the threaded edges of the bottom disk 16.

In Fig. 2 I illustrate the wedge or exterior conic ring 20 in its upper position, and when said ring is in this position, the lamella ring 10 and sectional ring 12 will define their maximum diameter. When the top disk 22 is rotated to move the wedge or conic ring 20 downwardly against the sectional ring 12, the diameter defined by the lamella ring 10 and said ring 12, will be reduced, and when the ring 20 is moved to its extreme lower position, shown in Fig. 3, it will operate to close the sections 13 of the ring 12 and the lamella 10 inwardly so that they will then define their minimum diameter. The required diameters may be set in accordance with the distance the ring 20 is screwed downwardly against the sectional ring 12, and one purpose of the invention is to afford proper adjustments between the maximum and minimum, of the internal diameter defined by the lamella ring 10 and sectional ring 12. I may provide a definite set of the instruments hereinbefore described to replace a very large number of the gage rings at present in use. When the lamella 10 becomes worn, it may be replaced by a new lamella, and this is also a feature of advantage.

What I claim as my invention and desire to secure by Letters-Patent, is:

1. An instrument of the character described, comprising an expansible and contractible inner ring, a sectional conic ring exterior to and engaging said inner ring, and an outer conic ring engaging said sectional ring and adapted on being actuated to slide the sections thereof inwardly to diminish the diameter or permit said sections to slide outwardly for increasing such diameter.

2. An instrument of the character described, comprising an expansible and contractible inner ring, a sectional conic ring exterior to and engaging said inner ring, and an outer conic ring engaging said sectional ring and adapted on being actuated to slide the sections thereof inwardly to diminish the diameter or permit said sections to slide outwardly for increasing such diameter, said inner ring being a lamella and the inner faces of the sections of said sectional ring being grooved and holding said lamella in such groove.

3. An instrument of the character described, comprising an expansible and contractible inner ring, a sectional conic ring exterior to and engaging said inner ring, and an outer conic ring engaging said sectional ring and adapted on being actuated to slide the sections thereof inwardly to diminish the diameter or permit said sections to slide outwardly for increasing such diameter, said inner ring being a lamella and the inner faces of the sections of said sectional ring being grooved and holding said lamella in such groove, and said sections also having a series of incisions in their inner portions.

4. An instrument of the character described, comprising an expansible and contractible inner ring, a sectional conic ring exterior to and engaging said inner ring, an outer rotary conic ring having a threaded outer surface and engaging with its inner inclined surface the inclined surface of said sectional ring for sliding the sections thereof inwardly to diminish the diameter or permit them to slide outwardly for increasing such diameter and an exterior cylindrical casing having a bottom on which the said sections may have sliding movement inwardly and outwardly and a threaded inner wall receiving the threaded exterior of said rotary ring.

5. An instrument of the character described, comprising an expansible and contractible inner ring, a sectional conic ring exterior to and engaging said inner ring, an outer rotary conic ring having a threaded outer surface and engaging with its inner inclined surface the inclined surface of said sectional ring for sliding the sections thereof inwardly to diminish the diameter or permit them to slide outwardly for increasing such diameter, and an exterior cylindrical casing having a bottom on which the said sections may have sliding movement inwardly and outwardly, a threaded inner wall receiving the threaded exterior of said rotary ring and a rotary open head having interlocking engagement with said rotary ring for actuating the same.

6. An instrument of the character described, comprising an expansible and contractible inner ring, a sectional conic ring exterior to and engaging said inner ring, an outer rotary conic ring having a threaded outer surface and engaging with its inner inclined surface the inclined surface of said sectional ring for sliding the sections thereof inwardly to diminish the diameter or permit them to slide outwardly for increasing such diameter, and an exterior cylindrical casing having a bottom on which the said sections may have sliding movement inwardly and outwardly, a threaded inner wall receiving the threaded exterior of said rotary ring and a rotary open head having interlocking engagement with said rotary ring for actuating the same, and said exterior casing having scale graduations along its side and said head having a nonus to coöperate with said graduations.

7. An instrument of the character described, comprising an expansible and contractible inner ring, a sectional conic ring exterior to and engaging said inner ring, an outer rotary conic ring having a threaded outer surface and engaging with its inner inclined surface the inclined surface of said sectional ring for sliding the sections thereof inwardly to diminish the diameter or permit them to slide outwardly for increasing such diameter, and an exterior cylindrical casing having a bottom on which the said sections may have sliding movement inwardly and outwardly, a threaded inner wall receiving the threaded exterior of said rotary ring and a rotary open head having interlocking engagement with said rotary ring for actuating the same, and said exterior casing having two parallel sets of scale graduations along its side, one being in inches and the other in millimeters, and said head having a double nonus to slide along both sets of said graduations.

8. An instrument of the character described, comprising an expansible and contractible inner ring, a sectional conic ring exterior to and engaging said inner ring, an outer rotary conic ring having a threaded outer surface and engaging with its inner inclined surface the inclined surface of said sectional ring for sliding the sections thereof inwardly to diminish the diameter or permit them to slide outwardly for increasing such diameter, and an exterior casing having a bottom on which said sections may have sliding movement inwardly and outwardly, a threaded inner wall receiving the threaded exterior of said rotary ring and means for actuating said rotary ring.

9. An instrument of the character described, comprising an expansible and contractible inner ring, a sectional conic ring exterior to and engaging said inner ring, an outer rotary conic ring having a threaded outer surface and engaging with its inner inclined surface the inclined surface of said sectional ring for sliding the sections thereof inwardly to diminish the diameter or permit them to slide outwardly for increasing such diameter, and an exterior casing having a bottom on which said sections may have sliding movement inwardly and outwardly, a threaded inner wall receiving the threaded exterior of said rotary ring and means for actuating said rotary ring, said inner ring being a spring lamella and the inner faces of the sections of said sectional ring being grooved and holding said lamella in such groove.

10. An instrument of the character described, comprising an expansible and contractible inner ring, a sectional conic ring exterior to and engaging said inner ring, an outer rotary conic ring having a threaded outer surface and engaging with its inner inclined surface the inclined surface of said sectional ring for sliding the sections thereof inwardly to diminish the diameter or permit them to slide outwardly for increasing such diameter, and an exterior casing having a bottom on which said sections may have sliding movement inwardly and outwardly, a threaded inner wall receiving the threaded exterior of said rotary ring and means for actuating said rotary ring, said inner ring being a spring lamella and the inner faces of the sections of said sectional ring being grooved and holding said lamella in such groove, and said sections also having a series of incisions in their inner portions.

11. An instrument of the character described, comprising an expansible and contractible inner ring, a sectional conic ring exterior to and engaging said inner ring, and an outer conic ring engaging said sectional ring and adapted on being actuated to slide the sections thereof inwardly to diminish the diameter or permit said sections to slide outwardly for increasing such diameter, said inner ring being a spring lamella having inwardly beveled upper and lower edges and the inner faces of the sections of said sectional ring being grooved and holding said lamella in such groove, which has undercut upper and lower edges to engage the beveled edges of said lamella.

12. An instrument of the character described, comprising an inner expansible and contractible lamella spring ring, a sectional ring exterior to and engaging said inner ring and the sections of which are outwardly slidable thereby to increase the diameter, and means for correspondingly sliding said sections inwardly against said ring to contract the same and thereby diminish the diameter.

13. An instrument of the character described, comprising an inner expansible and contractible lamella spring ring, a sectional ring exterior to and engaging said inner ring and the sections of which are outwardly slidable thereby to increase the diameter, and means for correspondingly sliding said sections inwardly against said ring to contract the same and thereby diminish the diameter, said lamella having inwardly beveled upper and lower edges and the sections of said sectional ring having grooves in their inner faces slidably holding said lamella and which grooves have undercut upper and lower edges to engage the beveled edges of the lamella.

Signed at New York city, in the county of New York and State of New York, this 6th day of July, A. D. 1918.

GEORGE DOONAEVSKI.

Witnesses:
ARTHUR MARION,
CHAS. C. GILL.